United States Patent
Solouki Bonab et al.

(10) Patent No.: US 12,552,930 B2
(45) Date of Patent: Feb. 17, 2026

(54) THERMOPLASTIC POLYURETHANE COMPOSITION

(71) Applicant: Lubrizol Advanced Materials, Inc., Cleveland, OH (US)

(72) Inventors: Vahab Solouki Bonab, Cleveland Heights, OH (US); Kenneth H. Kim, Hudson, OH (US); Aditi Shankar, North Royalton, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 722 days.

(21) Appl. No.: 17/640,193

(22) PCT Filed: Sep. 10, 2020

(86) PCT No.: PCT/US2020/050039
§ 371 (c)(1),
(2) Date: Mar. 3, 2022

(87) PCT Pub. No.: WO2021/050622
PCT Pub. Date: Mar. 18, 2021

(65) Prior Publication Data
US 2022/0340751 A1    Oct. 27, 2022

Related U.S. Application Data

(60) Provisional application No. 62/898,230, filed on Sep. 10, 2019.

(51) Int. Cl.
| | |
|---|---|
| *C08L 75/08* | (2006.01) |
| *C08G 18/12* | (2006.01) |
| *C08G 18/32* | (2006.01) |
| *C08G 18/48* | (2006.01) |
| *C08G 18/69* | (2006.01) |
| *C08L 75/14* | (2006.01) |

(52) U.S. Cl.
CPC .............. *C08L 75/08* (2013.01); *C08G 18/12* (2013.01); *C08G 18/3206* (2013.01); *C08G 18/4854* (2013.01); *C08G 18/69* (2013.01); *C08L 75/14* (2013.01); *C08G 2410/00* (2013.01); *C08L 2201/08* (2013.01); *C08L 2201/10* (2013.01); *C08L 2203/202* (2013.01); *C08L 2203/30* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 2017/0100817 A1 | 4/2017 | Ganapathiappan | |
| 2018/0201815 A1 | 7/2018 | Kelch et al. | |
| 2019/0024312 A1* | 1/2019 | Delmas | C08G 18/7614 |
| 2019/0055342 A1 | 2/2019 | Nam | |
| 2019/0256641 A1* | 8/2019 | Faust | C08G 18/244 |
| 2022/0120326 A1* | 4/2022 | Everett | C08K 7/14 |

FOREIGN PATENT DOCUMENTS

| | | |
|---|---|---|
| GB | 2336847 A | 11/1999 |
| WO | 98/56841 A1 | 12/1998 |
| WO | 2016/098073 A2 | 6/2016 |

* cited by examiner

*Primary Examiner* — Jeffrey D Washville
(74) *Attorney, Agent, or Firm* — Vincent A. Cortese; Michael A. Miller

(57) ABSTRACT

The invention relates to an article made from a thermoplastic polyurethane composition having that has high flex modulus, low density, and is capable of withstanding repeated cyclic deformation. The thermoplastic polyurethane composition is formed from the reaction product of a polyol component, which includes a blend of a polyether polyol, such as poly(tetramethylene ether glycol), and polybutadiene diol, a diisocyanate component, and a chain extender component.

23 Claims, No Drawings

THERMOPLASTIC POLYURETHANE COMPOSITION

CROSS REFERENCE TO RELATED APPLICATION

This application claims priority from PCT Application Serial No. PCT/US2020/050039 filed on Sep. 10, 2020, which claims the benefit of U.S. Provisional Application No. 62/898,230 filed on Sep. 10, 2019, the entirety of both of which is hereby incorporated by reference.

BACKGROUND

The utility of thermoplastic polyurethane materials for a variety of applications is being appreciated in many new industries. However, it is often difficult to find a single thermoplastic polyurethane composition that has combinations of properties that are suited for certain applications and articles. For example, many applications will require high modulus and hardness, but also the ability to withstand cyclic deformations and varying temperature ranges. Often polyamide-co-polyethers are used for these applications because they have high flex modulus, low density, and good low temperature fatigue resistance. However, thermoplastic polyurethane compositions that have high flex modulus lack low temperature cyclic fatigue behavior and are undesirably heavy. One reason for this is because in order to achieve the high flex modulus, the hard segment content of the thermoplastic polyurethane is increased, which also increases density and glass transition temperature. The higher density and glass transition temperatures result in less desirable performance when subject to cyclic deformations. Therefore, it is object of this invention to provide an article having a unique and unexpected combination of properties including high modulus, low density, and the ability to sustain cyclic deformations.

SUMMARY OF THE INVENTION

The present invention is an article made from a thermoplastic polyurethane composition having unique and unexpected properties. The article comprises a thermoplastic polyurethane composition having a flex modulus measured according to ASTM D790 of at least 160 MPa that can withstand at least 30,000, or even 40,000 low temperature fatigue cycles measured according to ASTM D1052 at −10° C. In addition, it is desirable for articles having these properties to be transparent. Such articles can be made by a novel thermoplastic polyurethane composition comprising the reaction product of a polyol component and a diisocyanate component, wherein the polyol component comprises a mixture of a polyether polyol and polybutadiene polyol. Examples of polyether polyols include poly(tetramethylene ether glycol), polypropylene glycol, polyethylene glycol, and polyoxymethylene. The polybutadiene polyol may include unsaturated polybutadiene polyols or diols or polybutadiene diol. In one embodiment, the polyol component comprises or consists of a mixture of poly(tetramethylene ether glycol) and polybutadiene polyol. In another embodiment, the polyol component comprises or consists of a mixture of poly(tetramethylene ether glycol) and unsaturated polybutadiene polyol. In still another embodiment, the polyol component comprises a polyether component that is a blend of poly(tetramethylene ether glycol) and an ethylene oxide endcapped poly(propylene glycol) and polybutadiene polyol. The thermoplastic polyurethane composition may optionally include a chain extender component. The invention also includes articles made from the thermoplastic polyurethane composition of the invention.

DETAILED DESCRIPTION

Thermoplastic polyurethane compositions are generally formed from the reaction product of a polyol component, a diisocyanate component, and optionally, a chain extender component. In the thermoplastic polyurethane composition of the present invention, the polyol component is a blend of polyols, wherein the blend includes a polyether polyol and a polybutadiene polyol.

The Polyol Component

The polyol component used in the thermoplastic polyurethane composition of the present invention is a blend of polyols, wherein the blend contains a polyether polyol and a polybutadiene polyol.

Polyether polyols are typically derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as Poly-THF® B, a block copolymer, and PolyTHF® R, a random copolymer.

In one embodiment, polyether polyols used in the present invention have a number average molecular weight (Mn) as determined by assay of the terminal functional groups of about 700 to about 10,000, for example, from about 1,000 to about 5,000, or even from about 1,000 to about 3,000, or even 1000 to about 2500, or even about 2000 to about 2500. In one embodiment, the number average molecular weight of the polyether polyol used in the present invention is less than 3000.

In one embodiment, the polyether polyol used in the polyol component of the present invention comprises or consists of poly(tetramethylene ether glycol). In another embodiment, the polyether polyol used in the polyol component is a blend of polyether polyols. For example, the blend of polyether polyols comprises or consists of poly(tetramethylene ether glycol) and ethylene oxide end capped poly(propylene glycol).

The polyol component of the present invention also includes a polybutadiene polyol. In one embodiment, the polybutadiene polyol is unsaturated. In one embodiment, the polybutadiene polyol comprises or consists of polybutadiene diol, which as used herein, also refers to hydroxyl terminated polybutadiene. The molecular weight of the polybutadiene polyol used to form the thermoplastic polyurethane of the present invention depends on the desired characteristics of article to be made. Polybutadiene polyols suitable for forming a thermoplastic polyurethane composition according to the present invention may have a molecular weight from about 100 to about 10,000, for example from about 300 to about 5,000, further for example from about 1,000 to about 3,000, for example, 2,000. In some embodiments, the polybutadiene polyol has an OH functionality of 2.0 to 3.0, for example, 2.0 to 2.6.

In one embodiment, the polybutadiene polyol is unsaturated, such that the polybutadiene polyol contains double bonds along the butadiene chain.

Commercially available polybutadiene polyols useful in the present invention include KRASOL™ LBH P-2000, KRASOL™ LBH 2000, and KRASOL™ HLBH P-2000 available from Cray Valley, and NISSO™ PB G 2000, NISSO™ PB-G1400, NISSO™ PB-GI1000, and NISSO PB-GI2000 available from Nippon Soda Co.

Polyisocyanate Component

The thermoplastic polyurethane compositions described herein are made using a polyisocyanate component. The polyisocyanate and/or polyisocyanate component may include one or more polyisocyanates. In some embodiments, the polyisocyanate component includes one or more diisocyanates.

Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates.

Examples of useful polyisocyanates include aromatic diisocyanates such as 4,4'-methylenebis(phenyl isocyanate) (MDI), m-xylene diisocyanate (XDI), 3,3'-dimethoxy-4,4'-biphenylenediisocyanate, phenylene-1,4-diisocyanate (PDI), phenylene-1,3-diisocyanate, naphthalene-1,5-diisocyanate, 3,3'-dimethyl-4,4'-biphenylene diisocyanate (TODI), 1,5-naphthalene diisocyanate (NDI), and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), hexane diisocyanate (HDI), 1,4-Bis (isocyanatomethyl) cyclohexane (1,4-H6XDI), and dicyclohexylmethane-4,4'-diisocyanate (H12MDI). Mixtures of two or more polyisocyanates may be used. In one embodiment, the diisocyanate used in the present invention comprises or consists of MDI.

Chain Extender Component

The thermoplastic polyurethane composition of the present invention is optionally made using a chain extender component. Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, triethylene glycol, tetraethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), pentaspiro glycol (PSG), hydroquinone bis(2-hydroxyethyl) ether hydroquinone (HQEE), dipropylene glycol (DPG), 2-methyl-1,3-propane diol, 2-butyl-2-ethyl-1,3-propane diol (BEPD), and the like, as well as mixtures thereof. In some embodiments, the chain extender includes BDO, HDO, 3-methyl-1,5-pentanediol, or a combination thereof.

In one embodiment of the present invention, the chain extender comprises or consists of 1,4-butane diol. In another embodiment, the chain extender component comprises or consists of 2-butyl-2-ethyl-1,3-propane diol. In another embodiment, the chain extender component comprises or consists of dipropylene glycol. In still another embodiment, the chain extender comprises or consists of neopentylglycol. In another embodiment, the chain extender component comprises mixtures of chain extenders selected from 1,4-butane diol, 2-butyl-2-ethyl-1,3-propane diol, dipropylene glycol, and neopentylglycol.

The hard segment content of a thermoplastic polyurethane composition is defined as the combined weight percent of the diisocyanate component and the chain extender component. In some embodiments of the present invention, the thermoplastic polyurethanes herein have a hard segment content of 49% to 80% by weight, for example 54% to 75% by weight.

In one embodiment of the present invention, the thermoplastic polyurethane comprises the reaction product of a polyether polyol and polybutadiene polyol, a diisocanate component, and optionally a chain extender component. In another embodiment, the thermoplastic polyurethane comprises the reaction product of a polyol component and a diisocyanate, where the polyol component comprises a mixture of a polyether polyol and polybutadiene polyol, wherein the polyether polyol is at least 50% by weight of the polyol component. In one such embodiment, the polyether polyol greater than 50% by weight of the polyol component. In another embodiment, polyol component comprises a mixture of polyether polyol and polybutadiene polyol in weight ratios from 90:10 to 40:60, for example, 80:20 to 60:40, even further for example, 70:30 to 60:40.

In another embodiment of the present invention, the thermoplastic polyurethane comprises the reaction product of a polyol component and a diisocyanate component, where the polyol component comprises or consists of a mixture of poly(tetramethylene ether glycol) and unsaturated polybutadiene diol and a diisocyanate component. In such an embodiment, the polyol component may comprise a mixture of poly(tetramethylene ether glycol) and polybutadiene diol in weight ratios from 90:10 to 40:60, for example, 80:20 to 60:40, even further for example, 70:30 to 60:40

Thermoplastic polyurethane compositions of the present invention may be made using any process now known or hereafter developed. For example, in one embodiment, the "one-shot" process may be used, where the reactants (polyol component, diisocyanate, and optionally, the chain extender component) are added to an extruder reactor and reacted. In another embodiment, the thermoplastic polyurethane may be prepared utilizing a pre-polymer process. In the pre-polymer process, the polyol intermediates are reacted with generally an equivalent excess of one or more diisocyanates to form a pre-polymer solution having free or unreacted diisocyanate therein. Subsequently, a chain extender, as noted above, is added in an equivalent amount generally equal to the isocyanate end groups as well as to any free or unreacted diisocyanate compounds. Typically, the pre-polymer route can be carried out in any conventional device including an extruder.

Optionally, it may be desirable to utilize catalysts such as stannous and other metal carboxylates as well as tertiary amines. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

Various types of optional components can be present during the polymerization reaction, and/or incorporated into the TPU elastomer described above. These include, but are not limited to, antioxidants, biocides, compatibilizers, electro-dissipative antistatic additives, fillers/reinforcing agents, flame and fire retardants, fungicides, impact modifiers, pigments, colorants, plasticizer, polymers, rheology modifiers, slip additives, and UV stabilizers. All of the additives described above may be used in an effective amount customary for these substances.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The present invention provides articles exhibiting unique combinations of properties. The articles comprise a thermoplastic polyurethane composition that have a flex modulus measured according to ASTM D790 of at least 160 MPa while exhibiting the ability to withstand at least 30,000 low temperature fatigue cycles measured according to ASTM D1052 at −10° C. In some embodiments, articles of the present invention comprise thermoplastic polyurethane compositions having a flex modulus of at least 160 MPa or even 200 MPa and exhibit the ability to withstand at least 40,000 low temperature fatigue cycles. Another unexpected property associated with the inventive thermoplastic polyurethanes of the present invention is the transparency of such materials. In one embodiment, articles of the present invention also include a thermoplastic polyurethane additionally showing transparency. In one embodiment, articles made with such a thermoplastic polyurethane exhibit a haze of 22% or less as measured according to ASTM D1003 on 75 mil injection molded plaques. Such articles may be made by known methods for making such articles by known methods such as molding, extruding, or 3D printing.

Thermoplastic polyurethane compositions of the present invention may be used in a variety of applications, including but not limited to industrial applications including hose and tubes and wire and cables such as high-pressure tubes, wire and cable coatings/insulation, footwear applications such as running shoes, cleated shoes, winter and summer sports equipment and applications such as snowboard, ski equipment, mountain climbing equipment, kayak and rafting equipment, golf equipment, golf balls, cycling equipment, personal protective equipment and applications such as shin guards, helmet and applications in personal electronic components.

A series of thermoplastic polyurethane sample compositions were formed by reacting the components noted in Table 1. The isocyanate component for all samples is MDI.

TABLE 1

| | Polyol component | Blend ratio | Chain extender | Hard segment (%)[1] | Hardness (D)[2] | Flex modulus (MPa)[3] | Low temp Fatigue (# of cycles)[4] | Haze (%) 75 mill thickness[5] |
|---|---|---|---|---|---|---|---|---|
| 1 | PTMEG:PBD | 60:40 | BDO | 80 | | 1852 | | |
| 2 | PTMEG:PBD | 60:40 | BDO | 75 | | 1805 | | |
| 3 | PTMEG:PBD | 60:40 | BDO | 66 | 74 | 1140 | 40K+ | |
| 4 | PTMEG:PBD | 60:40 | BDO | 64 | 64 | 1007 | 40K+ | |
| 5 | PTMEG:PBD | 20:80 | BDO | 59 | | 144 | | |
| 6 | PTMEG:PBD | 40:60 | BDO | 59 | | 595 | | |
| 7 | PTMEG:PBD | 60:40 | BDO | 59 | 66 | 699 | 40K+ | |
| 8 | PTMEG:PBD | 70:30 | BDO | 59 | 63 | 543 | 40K+ | 22 |
| 9 | PTMEG:PBD | 80:20 | BDO | 59 | | 587 | | |
| 10 | PTMEG:PBD | 90:10 | BDO | 59 | | 153 | | |
| 11 | PTMEG:PBD | 60:40 | BDO | 54 | 55 | 444 | 40K+ | |
| 12 | PTMEG:PBD | 60:40 | BDO | 49 | | 91 | | |
| 13 | PTMEG:PBD[6] | 60:40 | BDO | 59 | | 383 | | |
| 14 | PTMEG:PBD[7] | 60:40 | BDO | 59 | | 370 | | |
| 15 | PPG:PBD | 60:40 | BDO | 59 | | 350 | | |
| 16 | PTMEG:EO capped PPG:PBD | 35:15:50 | BDO | 64 | | 938 | | |
| 17 | PTMEG:PBD | 60:40 | BDO:BEPD (30:70) | 54 | 58 | 228 | 40K+ | 5.3 |
| 18 | PTMEG:PBD | 60:40 | BDO:DPG (20:80) | 54 | 59 | 172 | 40K+ | |
| 19 | PTMEG:PBD | 60:40 | DPG | 54 | 60 | 160 | 40K+ | |
| 20 | PTMEG:PBD | 60:40 | BEPD | 54 | 62 | 289 | 40K+ | |
| 21 | PTMEG:PBD | 60:40 | BDO:NPG:BEPD (30:20:50) | 59 | | 605 | | |
| 22 | PTMEG:PBD | 60:40 | BDO:BEPD (30:70) | 59 | 67 | 553 | 40K+ | |

TABLE 1-continued

| | Polyol component | Blend ratio | Chain extender | Hard segment (%)[1] | Hardness (D)[2] | Flex modulus (MPa)[3] | Low temp Fatigue (# of cycles)[4] | Haze (%) 75 mill thickness[5] |
|---|---|---|---|---|---|---|---|---|
| 23 | PTMEG:PBD | 60:40 | BDO:DPG (20:80) | 59 | 64 | 362 | 40K+ | |
| 24 | PTMEG:PBD | 60:40 | NPG | 59 | | 719 | | |
| 25 | PTMEG:PBD | 60:40 | BDO:NPG (10:90) | 59 | | 691 | | |
| C1 | PTMEG | 100 | BDO | 80 | | 1951 | | |
| C2 | PTMEG | 100 | BDO | 75 | | 1214 | | |
| C3 | PTMEG | 100 | BDO | 69 | 75 | 970 | 6K | 2.4 |
| C4 | PTMEG | 100 | BDO | 66 | | 484 | | |
| C5 | PTMEG | 100 | BDO:DPG (87:13) | 66 | 70 | 423 | 15K | 1.5 |
| C6 | PTMEG | 100 | BDO | 64 | | 345 | | |
| C7 | PTMEG | 100 | BDO | 62 | | 320 | | |
| C8 | PTMEG | 100 | BDO | 59 | | 120 | | |
| C9 | PTMEG | 100 | BDO | 58 | 65 | 116 | 40K+ | 5.9 |
| C10 | PTMEG | 100 | BDO | 49 | | Low[8] | | |
| C11 | PBD | 100 | BDO | 80 | | 792 | | 100 |
| C12 | PBD | 100 | BDO | 64 | | 71 | | 100 |
| C13 | PBD | 100 | BDO | 59 | | Low[8] | | 100 |
| C14 | PBD | 100 | BEPD | 64 | | 71 | | |
| C15 | PBD | 100 | DPG | 64 | | 165 | | |
| C16 | Polycaprolactone diol | 100 | BDO | — | 65 | 306 | 20K | 42.5 |
| C17 | Sebacis:BDO | 100 | BDO:DPG (93:7) | — | 55 | 115 | 40K+ | 11.2 |

[1]Hard Segment is the total weight % of the polyisocyanate component and chain extender component.
[2]Hardness is measured using a Durometer according to ASTM D2240.
[3]Flex modulus was measured according to ASTM D790.
[4]Low temp fatigue was measured according to ASTM D1052 at −10° C. The flex angle was 60° and the frequency was 1.7 Hz. The testing was discontinued after 40K cycles
[5]Haze was measured according to ASTM D1003 on 75 mil injection molded plaques
[6]PBD[6] is polybutadiene polyol with average molar mass of 2900 g/mol, OH functionality of 2.4 (approx.). The isomer ratio of 1,2-vinyl, 1,4-trans and 1,4-cis is approximately 22, 58 and 20% respectively. The commercial name is Polyvest HT
[7]PBD[7] is polybutadiene polyol with average molar mass of 2800 g/mol, OH functionality of 2.4-2.6 (approx.). The ratio of 1,2-vinyl, 1,4-trans and 1,4-cis isomers is approximately 20, 60 and 20% respectively. The commercial name is Poly bd R45LTO.
[8]The samples were too soft (low flex modulus) for reliable flex modulus testing.

The results in Table 1 show that the combination of poly(tetramethylene ether glycol) and polybutadiene diol provide an unexpected and synergistic effect in terms of flexural modulus and ability to withstand cyclic deformations. It would generally be expected that the addition of polybutadiene diol to a thermoplastic polyurethane composition including a polyether polyol would lower the flex modulus, but as the data in Table 1 illustrates, the flex modulus of thermoplastic polyurethanes containing the combination is unexpectedly higher. In addition, the inventive examples are able to withstand a high number of cyclic deformations.

As used herein, the transitional term "comprising", which is synonymous with "including", "containing," or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the basic and novel characteristics of the composition or method under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An article comprising:
a thermoplastic polyurethane composition having a flex modulus measured according to ASTM D790 of at least 160 MPa that can withstand at least 30,000 low temperature fatigue cycles measured according to ASTM D1052 at −10° C., wherein the thermoplastic polyurethane composition comprises the reaction product of a polyol component comprising a mixture of a polyether polyol and an unsaturated polybutadiene polyol in a weight ratio from 90:10 to 40:60 or, a diisocyanate component, and a chain extender component, wherein the thermoplastic polyurethane has a hard segment content of 49% to 80% by weight, wherein the hard segment content is defined as the combined weight of the diisocyanate component and the chain extender component.

2. The article of claim 1, wherein the chain extender is selected from 1,4-butanediol, 2-butyl-2-ethyl-1,3-propandiol, 2-butyl-2-ethyl-1,3-propandiol, neopentyl glycol, and mixtures thereof.

3. The article of claim 1, wherein the polyol component comprises a mixture of a polyether polyol and polybutadiene polyol.

4. The article of claim 1, wherein the polyether polyol comprises or consists of poly(tetramethylene ether glycol).

5. The article of claim 1, wherein the polybutadiene polyol comprises or consists of polybutadiene diol.

6. The article of claim 1, wherein the thermoplastic polyurethane can withstand at least 40,000 low temperature fatigue cycles measured according to ASTM D1052 at −10° C.

7. The article of claim 1, wherein the thermoplastic polyurethane is transparent.

8. The article of claim 1, wherein the thermoplastic polyurethane has a haze measured according to ASTM D1003 of 22% or less.

9. The article of claim 1, wherein the article is a shoe sole.

10. The article of claim 1, wherein the article is a pipe or tube.

11. The article of claim 1, wherein the article is a wire or cable.

12. The article of claim 1, wherein the article comprises sports equipment selected from snowboards, skis, mounting climbing equipment, kayaks, rafts, golf equipment, golf balls, cycling equipment, personal protective equipment (e.g. shin guards, and helmets).

13. The article of claim 1, wherein the article is a component of a personal electronic device.

14. A method of making an article, comprising:
molding, extruding, or 3D printing a thermoplastic polyurethane composition having a flex modulus measured according to ASTM D790 of at least 160 MPa that can withstand at least 30,000 low temperature fatigue cycles measured according to ASTM D1052 at −10° C. to form an article, wherein the thermoplastic polyurethane composition comprises the reaction product of a polyol component comprising a mixture of a polyether polyol and an unsaturated polybutadiene polyol in a weight ratio from 90:10 to 40:60 or, a diisocyanate component, and a chain extender component, wherein the thermoplastic polyurethane has a hard segment content of 49% to 80% by weight, wherein the hard segment content is defined as the combined weight of the diisocyanate component and the chain extender component.

15. The method of claim 14, wherein the thermoplastic polyurethane can withstand at least 40,000 low temperature fatigue cycles measured according to ASTM D1052 at −10° C.

16. The method of claim 14, wherein the article is a shoe sole, a pipe, a tube, a wire, or a cable.

17. The method of claim 14, wherein the thermoplastic polyurethane composition comprises the reaction product of a polyether polyol and an unsaturated polybutadiene polyol; a diisocyanate component; and a chain extender component.

18. The method of claim 14, wherein the polyol component comprises the reaction product of poly(tetramethylene ether glycol) and polybutadiene polyol in a weight ratio from 90:10 to 40:60 or 80:20 to 60:40.

19. The method of claim 14, wherein the thermoplastic polyurethane has a hard segment content of 49% to 80% by weight or 54% to 75% by weight, wherein the hard segment content is defined as the combined weight of the diisocyanate component and the chain extender component.

20. The method of claim 14, wherein the article is formed by molding.

21. The method of claim 14, wherein the article is formed by extruding.

22. The method of claim 14, wherein the article is formed by 3D printing.

23. The article of claim 1, wherein the thermoplastic polyurethane has a hard segment content of 54% to 75% by weight.

* * * * *